United States Patent [19]
Schweitzer, III

[11] Patent Number: 5,208,545
[45] Date of Patent: May 4, 1993

[54] APPARATUS AND METHOD FOR ELIMINATING PHASE SKEW IN A MULTI-CHANNEL DATA ACQUISITION SYSTEM

[75] Inventor: Edmund O. Schweitzer, III, Pullman, Wash.

[73] Assignee: Schweitzer Engineering Laboratories Inc., Pullman, Wash.

[21] Appl. No.: 676,099

[22] Filed: Mar. 27, 1991

[51] Int. Cl.$^5$ .......................... H03K 5/59; H03K 5/00
[52] U.S. Cl. .................................... 328/151; 307/352; 341/123; 341/155
[58] Field of Search ................ 328/151; 307/352, 353; 341/122, 123, 124, 155, 161

[56] References Cited
U.S. PATENT DOCUMENTS

| | | | |
|---|---|---|---|
| 4,353,057 | 10/1982 | Bernet et al. | 328/151 |
| 4,502,049 | 2/1985 | Atkinson | 328/151 |
| 4,866,441 | 9/1989 | Conway et al. | 328/151 |

Primary Examiner—Timothy P. Callahan

[57] ABSTRACT

In one embodiment, the sampling order of voltage/current data channels from a power transmission line is controlled so that the average sampling instant for each channel is the same. In one example involving a six-channel system, the sampling order will alternate between 1,2,3,4,5,6 and 6,5,4,3,2,1. The sampled data is applied through a digital filter which averages the sampling instant for each channel. In another embodiment, low-pass filters are positioned on each channel, the low-pass filter introducing a predetermined delay for each channel which compensates for the sampling delay on each channel where the channels are sampled in a particular sequential order, i.e. 1,2,3,4 . . . n. The shortest delay will be present in the low-pass filter associated with the first channel, a slightly longer delay will be present in the low-pass filter associated with the second channel and so on through the nth channel.

24 Claims, 2 Drawing Sheets

APPARATUS AND METHOD FOR ELIMINATING PHASE SKEW IN A MULTI-CHANNEL DATA ACQUISITION SYSTEM

TECHNICAL FIELD

This invention relates generally to data acquisition systems for electrical signals and more particularly concerns an apparatus for eliminating phase skew between channels in a multi-channel data acquisition system for an electric power system protective relay.

BACKGROUND OF THE INVENTION

In an electric power system, analog voltage and current values are obtained from a particular source thereof, including, as one example, power transmission lines. The voltage and/or current signals which are typically continuous from the transmission line are applied through transformers and then processed by protective relay systems in order to ensure proper operation of the electric power system and prevent harm to the system by various kinds of faults. In many cases, the protective relays use digital signal processing, which requires the conversion of the analog data from the transmission line to corresponding digital data, typically by conventional methods of sampling and analog-to-digital conversion. Typically, it is important that the phase relationship between the signals be maintained. The calculation of power, for instance, from voltage and current information is inaccurate if there is a phase shift or delay between the voltage and current signals.

Analog/digital conversion and multiplexing typically introduce a time delay between the data on the first and last channels in a multi-channel data system. The time delay corresponds to a particular value of phase skew when the acquired signals are periodic. If, for instance, there are six channels of analog data in a particular system, with an analog/digital conversion and multiplexing time per channel of approximately 25 microseconds, which corresponds to 0.5 electrical degrees at 60 hertz, the total phase skew for the entire system, i.e. between the first and last channels, will be 2.5 electrical degrees. If no phase compensation is made, it will appear, incorrectly, as though the input signals differ in phase by 2.5 degrees. This is typically not acceptable.

A conventional and accepted method to prevent such a phase shift caused by multiplexing and analog/digital conversion, is by using sample and hold gates for each channel. Such a system is shown in FIG. 1. High voltage and current values on input lines 12–17 (six channels are shown as an example) are applied to transformers 18—18, the output lines of which are applied to low pass filters 20—20. From there, the signals are applied to sample and hold gates 22—22, controlled by a clock-based controller 24, which produces a fixed sequence of control signals. The outputs of the sample and hold gates 22—22 are then applied to a multiplexer 26, the output of which is applied to an analog-to-digital (A/D) converter 28. Both the multiplexer 26 and the A/D converter 28 are controlled by controller 24. The resulting digital output signals from the A/D converter 28 are applied to signal processor 30. The six channels of data are hence sampled simultaneously, although it is assumed that any delays introduced by the analog filters of each channel are equal.

However, sample and hold gates are expensive and themselves introduce some error into the processing of the signals, as well as occupying circuit board space. It is recognized that, as another solution, an A/D converter could be used on each channel, but that would add significant expense to the overall cost of the system. In still another approach, all the sample and hold gates of FIG. 1 could be eliminated, with the processor itself being adapted to remove the phase shift. In a particular example, digital filters are provided for each channel in the processor, with the filters having different delays to offset the skew for each channel. This approach does, however, add a significant computational burden to the processor. Further, the design of the filters for each channel specifically depends on the respective multiplexing and A/D conversion times.

Hence, there is a need for a signal processing system in which multi-channel analog signals are converted into digital signals and multiplexed without significant phase skew being introduced between the channels.

DISCLOSURE OF THE INVENTION

Accordingly, one embodiment of the present invention is an apparatus and method for eliminating phase skew in a multi-channel data acquisition system, wherein the apparatus/method comprises receiving analog input signals from a source thereof, such as an electric power system on a plurality of channels; and selecting the input signals on each channel, respectively, at predetermined time intervals wherein the channels are selected in at least two different orders such that the average phase skew between the channels is substantially zero.

In another embodiment, the apparatus/method comprises receiving analog input signals from a source thereof, such as an electric power system, on a plurality of channels; and low-pass filtering the received input signals, wherein the low-pass filter on each channel includes a delay characteristic, the delay characteristic of the low-pass filters, respectively, being selected so as to compensate for the sampling delay for each channel, so that the sampling of the signals on the respective channels is such that the phase skew between the channels is substantially zero.

BEST MODE FOR CARRYING OUT THE INVENTION

Figure 1:
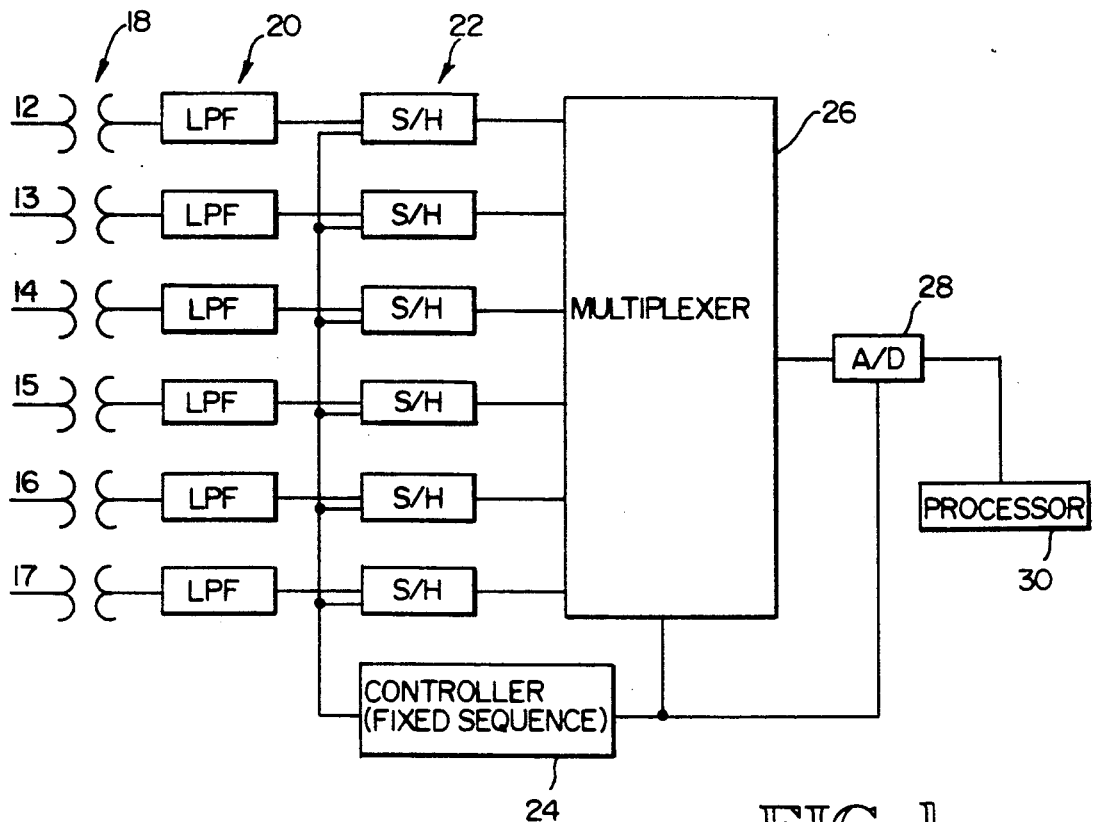
FIG. 1 is a block diagram showing a prior art system.
Figure 2:
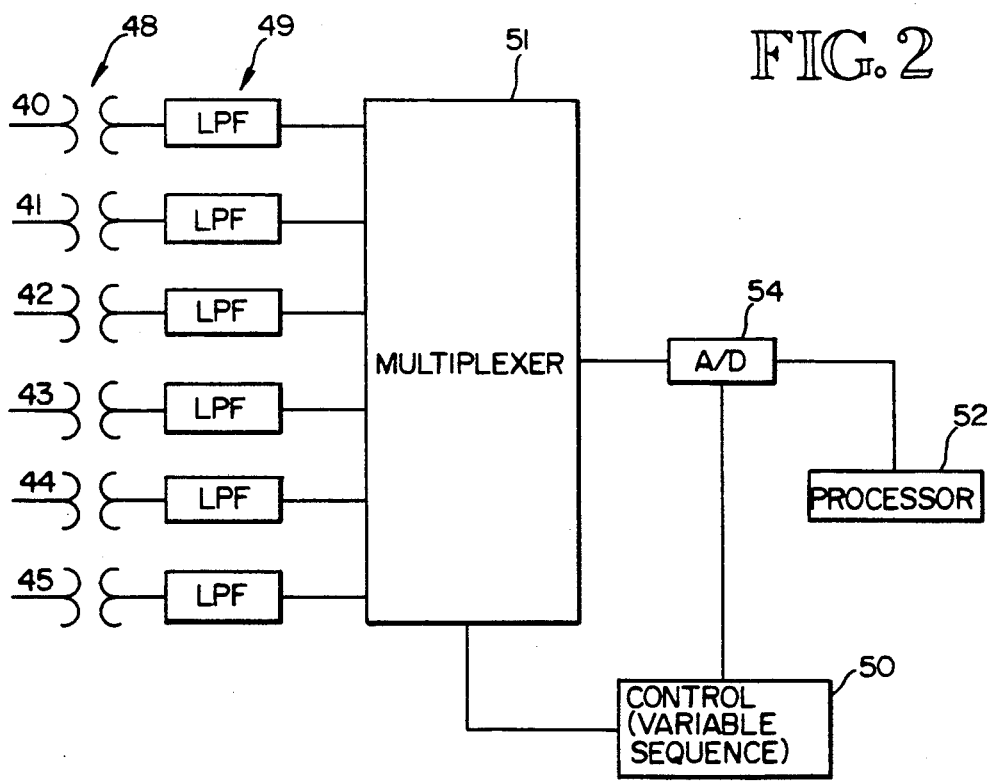
FIG. 2 is a block diagram showing one embodiment of the present invention.

FIG. 2 shows a system which obtains several channels of analog data from a power system, such as a transmission line, and multiplexes the channels in a particular order to avoid a delay between the channels following processing. Specifically, analog signals such as voltage and current values from an electric power system are present on channels 40–45. While a total of six channels are shown, it should be understood that a different number of channels could be used. In conventional fashion, the analog signals from the power system are initially applied through transformers 48—48 to reduce the signal levels to that which is appropriate for subsequent selected analog and digital signal processing and then from there to conventional low-pass filters 49—49 for each channel. Up to this point, the system is conventional.

Each channel is sampled, i.e. periodically selected, at a point downstream of low-pass filters 49—49. Selection is accomplished under the control of a selection order control element or system 50. Element 50, which may either be independent of or related to the input signals in terms of frequency, selects the channels in a predetermined order for predetermined times for multiplexing and output on line 51. The channel selection is accomplished in a particular order to average the "sampling instant" i.e. the time of initiation of the selection of a particular channel within a complete run covering all the channels, for each channel. Each channel in the present embodiment on average will have the same sampling instant. This requires that the order of selection of the channels be varied in a predetermined fashion.

One selection order which would satisfy this requirement is to select the channels applied to the multiplexer 51 in consecutive order from first to last, i.e. 1,2,3,4,5,6, in a first run and then in the next run to select the channels in consecutive reverse order, i.e. 6,5,4,3,2,1, with the next selection again being 1,2,3,4,5,6, and so on. The result of this is that the average time instant for each channel for a complete run of all the channels is approximately half way between the sampling instants for the third and fourth channels for a single channel selection run from first to last. In a specific example, the instant for the first channel in the first selection run would be the smallest, i.e. zero microseconds, while the last channel sampled would have an instant of 125 microseconds, with the others spaced in between. In the second run, the instants would be reversed. The averaging sampling instant will thus be 62.5 microseconds for all channels.

While an example has been provided disclosing one particular overall selection order (1,2,3,4,5,6; 6,5,4,3,2,1, etc.) to provide the desired averaging for the several channels, it should be understood that other, more complex selection orders may be used to accomplish the same result. The present invention thus is not limited to a particular overall sampling order, but rather is concerned with arranging sampling orders to give an overall average which is the same for all channels. Since the average sampling instant is the same for all channels, there is no phase skew between the channels.

The actual time averaging for each channel is accomplished through the use of a digital filter in the processor 52, after the multiplexed data has been converted to digital data by A/D converter 54. The digital filter may also perform other signal processing functions, such as removing DC offset and harmonics from the digital signal. It should be understood that the digital filter may be implemented in a computer program and may be designed to extract a selected frequency or frequencies or other information from the data.

Figure 3:
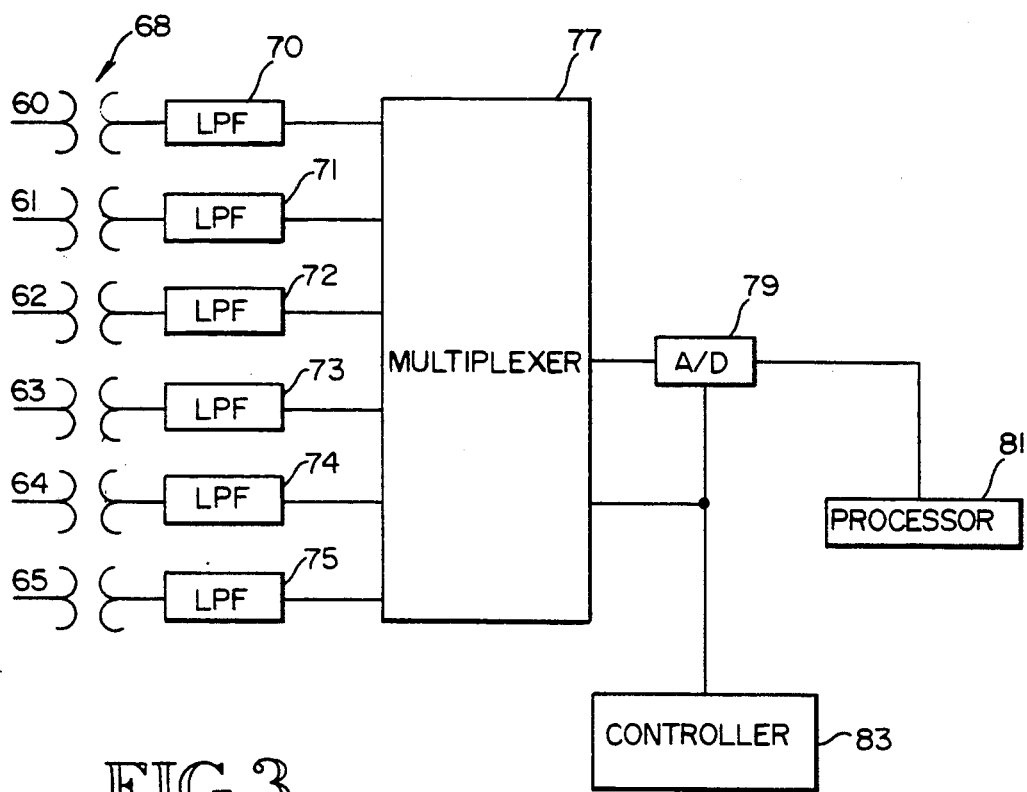
FIG. 3 is a block diagram showing another embodiment of the present invention.

FIG. 3 shows another embodiment of the present invention. In this embodiment, analog signals, such as voltages and currents, obtained from a power system, such as a transmission line, are on input lines 60–65. These signals are applied to transformers 68—68, in conventional fashion. The output signals from the transformers 68—68 are then applied to low-pass filters 70–75. The low-pass filters have constant delay, i.e. linear phase, characteristics, and may be either active or passive filters. In the circuit of the embodiment of FIG. 3, the delay in each low-pass filter is selected to accommodate the delay in the order of selection by the multiplexer 77, such that the increasingly later sampling of each channel still begins at the same point on the signal for each channel. Hence, the first channel will have the least delay because of its earliest position in the selection order. The signals from the multiplexer 77 are then applied to an A/D converter 79, the output of which is applied to a processor 81. The multiplexer 77 and the A/D converter 79 are controlled by a controller 83.

The advantage of this approach is the lack of any requirement of additional components or signal processing time. However, components in each low-pass filter must be specifically adjusted/selected in order to produce the desired delay for each channel. In practice, this is not difficult, since some adjustment of the components may be necessary even in conventional processing circuits in order to minimize minor phase shift errors between the channels.

In this embodiment, the objective is not to produce the same average instant of sampling for each channel, as for the embodiment of FIG. 2, but rather to introduce a compensating delay in each low-pass filter relative to the sampling delay of the channel so that the sampling of each channel occurs at the same points on the signals of each channel.

While it is preferred that the delay be in the low-pass filter itself, it should be understood that it is possible to use a separate compensating delay element for each channel.

Hence, a system has been disclosed which results in the elimination of phase skew between channels in a multi-channel data acquisition system, such as for a protective relay for power systems.

Although a preferred embodiment of the invention has been disclosed herein for illustration, it should be understood that various changes, modifications and substitutions may be incorporated in such embodiment without departing from the spirit of the invention as defined by the claims which follow:

What is claimed is:

1. An apparatus for eliminating phase skew in a multi-channel data acquisition system, comprising:

means for receiving analog input signals from an electric power system on a plurality of channels, wherein successive sampling of analog input signals on a plurality of channels will ordinarily result in a phase skew between channels; and means for sampling the input signals on each channel at predetermined time intervals, wherein the channels are sampled in at least two different successive orders of sampling such that an average phase skew between the channels is substantially zero.

2. An apparatus of claim 1, wherein the electric power system is a power transmission line.

3. An apparatus of claim 1, wherein a first sampling order proceeds from the first channel to the last channel in consecutive order and wherein a second sampling order proceeds from the last channel to the first channel in consecutive order and wherein the first and second orders are performed alternately.

4. An apparatus of claim 1, including means for averaging a sampling instant for each channel and wherein the average sampling instant for all the channels is the same.

5. An apparatus of claim 4, wherein the averaging means is a digital filter.

6. An apparatus of claim 5, wherein the digital filter is implemented in software.

7. An apparatus of claim 5, wherein the digital filter includes means for extracting a selected frequency component of the input signals.

8. An apparatus of claim 1, wherein the sampling means includes a control element for selection of the channels to be sampled, said control element operating at a frequency which is independent of the frequency of the input signals.

9. An apparatus of claim 1, wherein the sampling means includes a control element for selection of the channels to be sampled, the control element operating at a frequency which is related to a frequency component of the input signals.

10. A method for eliminating phase skew in a multi-channel data acquisition system, comprising the steps of:
receiving analog input signals from an electric power system on a plurality of channels, wherein successive sampling of analog input signals on a plurality of channels will ordinarily result in a phase skew between channels; and
sampling the input signals on each channel at predetermined time intervals, wherein the channels are sampled in at least two different successive orders of sampling such that an average phase skew between the channels is substantially zero.

11. A method of claim 10, wherein a first sampling order proceeds from the first channel to the last channel in consecutive order and wherein a second sampling order proceeds from the last channel to the first channel in consecutive order and wherein the first and second orders are performed alternately.

12. A method of claim 10, including the step of averaging a sampling instant for each channel and wherein the average instant sampling instant for all the channels is the same.

13. A method of claim 12, including the step of extracting a selected frequency component of the input signals.

14. A method of claim 10, wherein the analog input signals are from a power transmission line, and wherein the apparatus is part of a protective relay for the power transmission system.

15. An apparatus for eliminating phase skew in a multi-channel data acquisition system, comprising:
means for receiving analog input signals from an electric power system on a plurality of channels, wherein successive sampling of analog input signals on a plurality of channels will ordinarily result in a phase skew between channels;
means for sampling the input signals on each channel at predetermined time intervals; and
means on each channel for low pass filtering the received input signals, wherein each low-pass filter includes a delay characteristic, the delay characteristic of the low-pass filters, respectively, compensating for the sampling delay of each channel so that the sampling of the signals on the respective channels is such that the phase skew between the channels is substantially zero.

16. An apparatus of claim 15, wherein the input signals are voltage and current signals from a power transmission line and wherein the apparatus forms part of a protective relay for the power transmission line.

17. An apparatus of claim 15, wherein the low-pass filters are passive filters.

18. An apparatus of claim 15, wherein the low-pass filter are active filters.

19. An apparatus of claim 15, including means for multiplexing the signals on the channels, the multiplexing means being located after the low-pass filter means.

20. An apparatus of claim 19, including a control element for selection of the channels to be sampled, said control element operating at a frequency which is independent of the input signals.

21. An apparatus of claim 19, including a control element for selection of the channels to be sampled, the control element operating at a frequency which is related to a frequency component of the input signals.

22. A method for eliminating phase skew in a multi-channel data acquisition system, comprising the steps of:
receiving analog input signals from an electric power system on a plurality of channels, wherein successive sampling of analog input signals will ordinarily result in a phase skew between channels;
sampling the input signals on each channel at predetermined time intervals; and
low-pass filtering the received input signals on each channel, wherein each low-pass filter includes a delay characteristic, the delay characteristic of the low-pass filters, respectively, compensating for the sampling delay of each channel, so that the sampling of the signals on the respective channels is such that the phase skew between the channels is substantially zero.

23. A method of claim 22, wherein the input signals are voltage and current signals from a power transmission line.

24. A method of claim 22, including the step of multiplexing the signals on each of the channels, following the step of low-pass filtering.

* * * * *